UNITED STATES PATENT OFFICE.

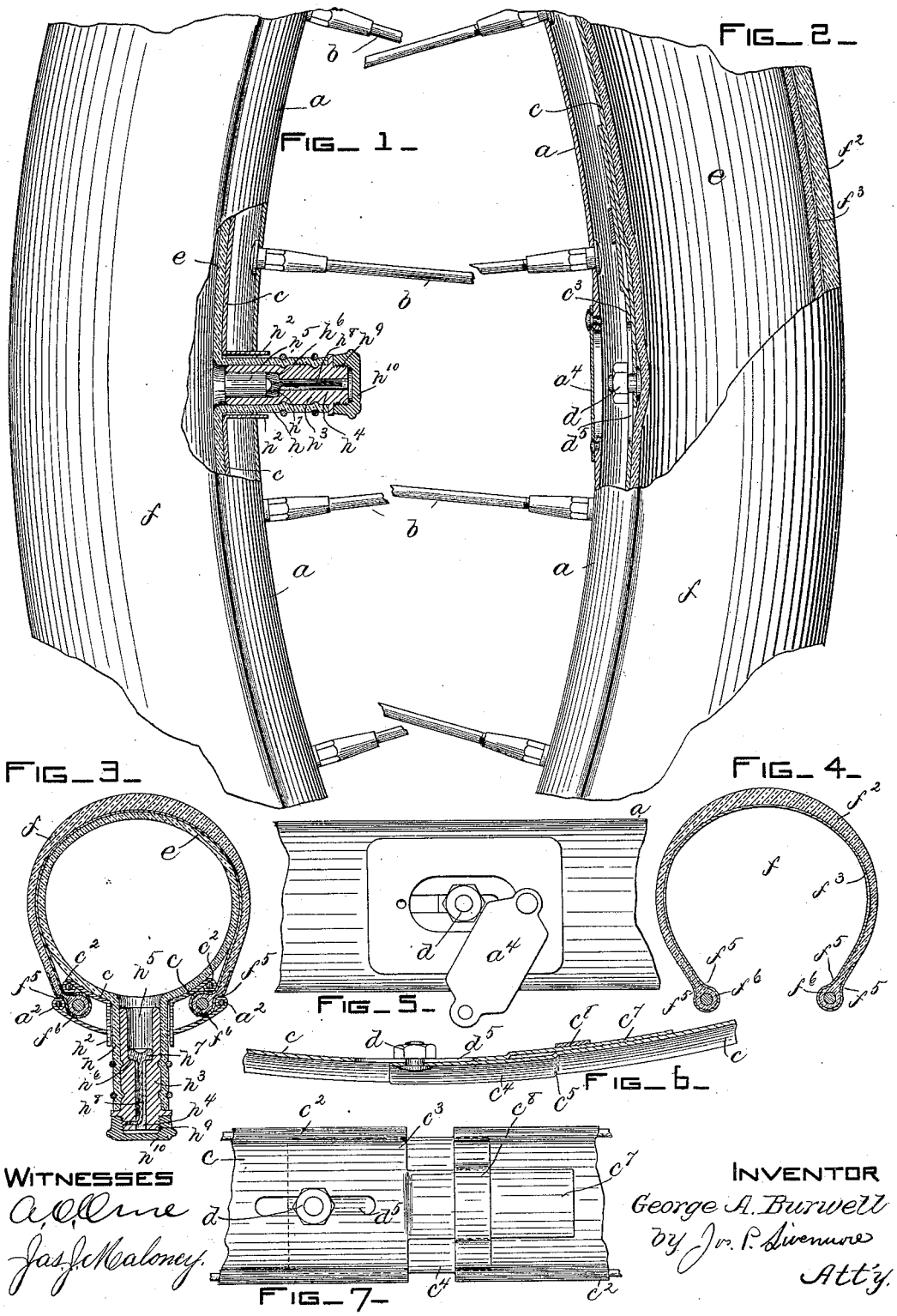

GEORGE A. BURWELL, OF TOLEDO, OHIO.

PNEUMATIC-TIRED WHEEL.

SPECIFICATION forming part of Letters Patent No. 486,556, dated November 22, 1892.

Application filed May 2, 1892. Serial No. 431,537. (No model.)

*To all whom it may concern:*

Be it known that I, GEORGE A. BURWELL, of Toledo, county of Lucas, State of Ohio, have invented an Improvement in Pneumatic-Tired Wheels, of which the following description, in connection with the accompanying drawings, is a specification, like letters on the drawings representing like parts.

My invention relates to a pneumatic-tired wheel for bicycles or other vehicles; and it consists, essentially, in the combination of the tire with the wheel-rim and a clamping-band, as will be hereinafter described, whereby the expansive pressure of the tire produces the gripping action of the clamp by which the tire is securely fastened to the wheel-rim.

The wheel forming the subject of this invention is provided with a rim, which may be connected with the spokes in the usual manner, and the tire comprises an air-tube, (which is an endless unbroken tube impervious to air, but provided with an inflating-passage,) and a protecting strip or shield which is substantially non-extensible and of such width that when wrapped about the air-tube the edges of the inclosing strip overlap the edges of the wheel-rim for a short distance. The locking or clamping rim may be a rim or hoop of sheet metal substantially like the wheel-rim, but of slightly-larger diameter and discontinuous, the ends of the said hoop meeting and overlapping each other and being capable of sliding past one another, so as to increase or diminish the effective length of the periphery of said clamping-rim. The clamping-rim is properly shaped to coincide with and support the air-tube when inflated and is interposed between the air-tube and the edges of the inclosing band for the air-tube, which edges are thus introduced between the edges of the wheel-rim and of the clamping-band. When the tire is inflated by forcing air into the air-tube, the outward expansion of the latter is resisted by the inclosing band, which is substantially non-extensible, as before described, and consequently the expansion of the air-tube is mainly inward against the clamping-rim, which, being capable of circumferential contraction and expansion by the overlapping of its ends, as before described, is contracted by the said pressure upon its outer surface, and thereby clamps the edges of the band tightly between the edges of the clamping-rim and of the wheel-rim, the said clamping pressure being greater the greater the pressure that is put upon the air-tube and its inclosing band.

The invention further consists in details of construction that will be hereinafter described.

Figures 1 and 2 are side elevations, partly in longitudinal section, of portions of a pneumatic-tired wheel embodying this invention; Fig. 3, a transverse section thereof at the inflating-passage, on a larger scale; Fig. 4, a transverse section of the inclosing strip detached; Fig. 5, a detail showing a portion of the inner surface of the wheel-rim in elevation; Fig. 6, a detail showing the meeting ends of the clamping-rim in longitudinal section, and Fig. 7 a plan view thereof.

The wheel forming the subject of this invention is provided with a rim $a$, which may be connected with the spokes $b$ in any usual manner and is preferably channel-shaped in cross-section and provided along its edges with outwardly-turned beads or projections $a^2$, which may be made, as shown, by rolling over the edges of the thin sheet metal of which the rim is composed. The said projection or lip affords a secure hold upon the outer covering-strip of the pneumatic tire, the edges of which are clamped between the edges of the rim $a$ and the edges of a clamping-band $c$, which may be a hoop or rim of metal similar to the wheel-rim $a$ and preferably provided with a holding lip or bead $c^2$ around its edges, the said clamping-rim $c$ being, furthermore, discontinuous and having its ends meeting and overlapped, as shown at $c^3$, so that the said rim is capable of contraction and expansion circumferentially. The said clamping-rim $c$ should be properly shaped to afford a seat for the air-tube $e$ of the tire, which when inflated will be supported against distension over a portion of its surface by the said clamping-rim $c$. The said air-tube $e$ is an endless unbroken tube of impervious material, and thus substantially air-tight, although expansible, and it does not necessarily have any great strength to resist internal air-pressure. The said air-tube is surrounded and supported against internal pressure by a covering-strip or envelope $f$, composed mainly of a body $f^2$, of rubber or other flexible and yielding material, having incorporated in or securely united to it a fabric or lining $f^3$, which, though flexible, is substantially non-extensible. The said strip or envelope $f$ is preferably provided along its edges with an enlargement $f^6$, forming depressions or grooves $f^5$ near to the edge of the strip, which is introduced between the wheel-rim $a$ and the clamping-rim $c$, so that the holding lips or beads $a^2$ and $c^2$ of the latter engage with the grooves $f^5$ of the flexible strip or envelope $f$. The edges of the strip $f$ may be easily inserted between the rims $a$ and $c$ in this manner when the air-tube is collapsed, or nearly so, permitting the rim $c$ to be expanded, and then upon inflating the air-tube it begins to expand quickly in all directions, thus tending to distend the envelope $f$ and to pull its edges out from between the rims $a$ $c$; but inasmuch as the said strip $f$ is substantially non-extensible the outward expansion of the air-tube begins to be resisted before it has become sufficient to pull the edges of the strip from between the rims, and owing to such resistance to its outward expansion the said air-tube is caused to expand inwardly against the clamping-rim $c$, which, being contractile, as before stated, yields to such expansion, the said rim $c$ itself contracting, and thus growing of smaller diameter and approaching the rim $a$, which is not contractible. Thus the contraction of the clamping-rim $c$ forces its edges toward those of the rim $a$, thus securely clamping the edges of the strip $f$ between the said rims, the clamping-pressure increasing with the distending-pressure in the air-tube and being sufficient to hold the edges of the strip $f$ against pulling out from between the rims $a$ and $c$ as the internal pressure increases. Thus the clamping and unclamping of the tire depends upon and is effected directly by the distension and collapsing of the tire. It is desirable when the tire has thus been clamped to secure the ends of the contracted clamping-rim $c$ together, so that the strip $f$ will not be immediately released upon a sudden collapse of the tire. For this purpose one end of the rim $c$ is provided with a clamping-bolt $d$, working in a slot $d^5$ in the other end of the said rim, and the wheel-rim $a$ is provided with a movable cover $a^4$, (see Fig. 5,) through which the said bolt is accessible. At the beginning of the operation of clamping the tire the said bolt $d$ is loosened, and when the tire has been clamped by the operation of inflation the said bolt may be tightened and the cover $a^4$ restored to its place.

The tire may be inflated through an inlet-passage to the air-tube of any usual construction. As shown in this instance, the said air-tube is provided with an inlet-pipe $h$, substantially integral therewith and passing through a tubular bushing $h^2$, connected with the outer rim $c$ and extending through an opening in the wheel-rim $a$, said parts being preferably located about diametrically opposite the point where the ends of the rim $c$ meet. The said bushing $h^2$ thus determines the position of the clamping-rim $c$ relative to the wheel-rim $a$, preventing it from becoming displaced circumferentially. The said inlet-pipe $h$ is provided with an internal metallic tube $h^3$, having a small passage $h^4$ in its outer end and a larger passage $h^5$ extending a short distance from its inner end and forming a seat or shoulder $h^6$ where it meets the smaller passage. A valve $h^7$, of rubber, is contained in the bore $h^5$ and co-operates with the seat $h^6$, said valve having a slender elastic stem $h^8$, preferably integral with it and of smaller diameter than the bore $h^4$, through which the stem passes, the said stem being secured to the tube $h^3$, as shown. Thus the elasticity of the stem $h^8$, together with the pressure from the inside of the air-tube against the valve $h^7$, holds the same tightly seated; but when the pressure at the outside in the bore $h^4$ is greater than the pressure in the air-tube, as during the operation of inflating, the said stem $h^8$ stretches, permitting the valve to unseat and the air to pass by it into the air-tube. The end of the tube $h^3$ is preferably threaded, as shown at $h^9$, to receive the removable cap $h^{10}$, which covers and protects the inflating-tube when the tire is in use and which may receive the nozzle of the inflating-pump when the tire is to be inflated.

The construction preferably adapted at the meeting ends of the rim $c$ is best shown in Figs. 6 and 7 on the outer end, and the lips $c^2$ terminate short of the maximum length of overlap, as shown in Fig. 7, so that only the unflanged portion $c^4$ travels along on the opposite end of the rim, said portion $c^4$ being slightly offset with relation to the main portion $c$, as best shown at $c^5$, Fig. 6, so as to bring the main portions $c$ at each side of the joint in line with one another. The inner of the overlapping ends is provided with a tongue $c^7$, which passes through a loop or strap $c^8$, connected with the inner or convex side of the opposite end of the rim. The terms "outer" and "inner" are used with reference to the axis of the wheel, the part more remote from the axis being spoken of as "outer" and the part nearer the axis as "inner."

I claim—

1. The combination of the wheel-rim connected with the wheel-spokes and the clamping-rim external thereto, the periphery of which is longitudinally extensible, with the air-tube having a portion of its surface supported directly against said clamping-rim and the substantially non-extensible covering-strip inclosing the outer portion of the said air-tube and having its edges interposed between the edges of the wheel-rim and the clamping-rim, as described, said clamping-rim being contracted solely by the pressure of the air-tube against it, and thereby caused to grip the edges of the covering-strip between the edges of the clamping-rim and wheel-rim, substantially as described.

2. The combination of the wheel-rim connected with the wheel-spokes and provided with an outwardly-turned lip or bead around its edges and the longitudinally-extensible clamping-rim having lips or beads around its edges, turned toward those of the wheel-rim, with the air-tube seated in said outer rim and the covering-strip surrounding the outer part of the air-tube and having its edges provided with enlargements introduced between the beaded edges of the wheel-rim and the clamping-rim, which is contracted solely by the pressure of the air in the air-tube, substantially as described.

3. The combination of the wheel-rim connected with the spokes and the clamping-rim surrounding said wheel-rim and disconnected therefrom and having its ends overlapped and capable of movement with relation to one another with the air-tube seated in said clamping-rim and the covering-strip, said air-tube being provided with an inflating-passage and the said clamping-rim being provided with a bushing inclosing said inflating-passage and extending through an opening in the wheel-rim, substantially as described.

4. The combination of the wheel-rim connected with the wheel-spokes and the clamping-rim surrounding said wheel-rim but disconnected therefrom and having its ends overlapped and capable of movement with relation to one another with a fastening-bolt connected with one end of said rim and working in a slot in the other end thereof, said wheel-rim being provided with an opening and a movable cover therefor adjacent to said fastening-bolt, substantially as described.

5. The combination of the wheel-rim connected with the wheel-spokes and the clamping-rim surrounding the said wheel-rim but disconnected therefrom and having its ends overlapped and capable of movement with relation to one another with the air-tube seated in said clamping-rim and the covering-strip, said air-tube being provided with an inflating-passage and the said clamping-rim being provided with a bushing inclosing said inflating-passage and extending through an opening in the wheel-rim, and a fastening-bolt connected with one end of said rim and working in a slot in the other end thereof, said wheel-rim being provided with an opening and a movable cover therefor adjacent to the said fastening-bolt, substantially as described.

6. The combination of the wheel-rim connected with the wheel-spokes and the clamping-rim surrounding the said wheel-rim and disconnected therefrom and having its ends overlapped and capable of movement with relation to one another with the air-tube and covering-strip co-operating with said clamping-rim, as described, one end of said clamping-rim being provided with a projecting tongue of less width than the rim and the other end with a loop or strap to receive said tongue, substantially as and for the purpose described.

In testimony whereof I have signed my name to this specification in the presence of two subscribing witnesses.

GEORGE A. BURWELL.

Witnesses:
CHAS. W. BOND,
CHAS. J. MOORE.